United States Patent
Libretto et al.

(10) Patent No.: US 7,375,871 B2
(45) Date of Patent: May 20, 2008

(54) ELECTROCHROMIC GLASS CONTROL DEVICE

(75) Inventors: John Libretto, N. Massapequa, NY (US); Michael Ostrovsky, Brooklyn, NY (US); Eugene Frid, Great Neck, NY (US); Edward Uftring, Syosset, NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 217 days.

(21) Appl. No.: 11/260,764

(22) Filed: Oct. 27, 2005

(65) Prior Publication Data
US 2007/0097484 A1 May 3, 2007

Related U.S. Application Data

(60) Provisional application No. 60/624,580, filed on Nov. 3, 2004.

(51) Int. Cl.
*G02F 1/15* (2006.01)
(52) U.S. Cl. .......................... 359/265; 349/33; 345/49; 345/105; 348/817
(58) Field of Classification Search ................ 359/265; 349/33; 345/49, 105; 348/817; 323/234; 315/291
See application file for complete search history.

(56) References Cited

U.S. PATENT DOCUMENTS

2005/0200934 A1* 9/2005 Callahan et al. ............ 359/265

* cited by examiner

*Primary Examiner*—Hung X. Dang
*Assistant Examiner*—Joseph Martinez
(74) *Attorney, Agent, or Firm*—Paul J. Sutton

(57) ABSTRACT

A light control system having a full range of dimming for smart-glass by providing an interface between an off-the-shelf dimmer and a electrochromic glass device is disclosed herein. The light control system or electrochromic glass control device acts as an interface that converts an asymmetric alternating current (AC) power signal from the dimmer device into a symmetric, amplitude controlled AC output signal for controlling the tint of the smart-glass device. The electrochromic glass control device includes a powerline interface circuit that receives the asymmetric AC power signal from the dimmer. A controller connects to the powerline interface circuit to generate a control signal responsive to the asymmetric AC power signal. Connecting between the dimmer and the controller, an output stage generates the symmetrical AC output signal responsive to the control signal to control the electrochromic glass device.

15 Claims, 3 Drawing Sheets

ELECTROCHROMIC GLASS CONTROL DEVICE

This application claims the benefit of U.S. Provisional Application No. 60/624,580, filed Nov. 3, 2004.

FIELD OF THE INVENTION

The present invention relates to 'smart' glass, and, more particularly, to an electrochromic glass control device.

BACKGROUND OF THE INVENTION

The twenty-first century has been marked by growing integration of technology within commercial buildings and residential homes. Smart homes of this new millennium have independent networks controlling various systems including communications, entertainment, lighting, heating, and security. More homes today are built with expansive great rooms, combination media rooms, cathedral ceilings, large architectural windows and other features that affect the distribution of both natural and electric light. Of particular interest to many architects, developers and builders is chromogenics. Chromogenics is the process by which 'smart' windows automatically change from light to dark in response to an environmental condition or in response to an applied voltage, altering the amount of light permitted into a room.

There are several technologies for smart-window applications which may be categorized into two separate categories. The first is "passive" where no electrical charge is needed to alter the amount of light permitted to radiate through the glass. Smart-glass that falls into this category reacts to environmental conditions, wherein the opacity of the glass is altered. Thermotropics and photochromics fall into this category. Thermotropics respond to environmental heating conditions and photocromics darkens in direct response to sunlight. While these technologies are cost efficient, they may not be the most practical applications for smart-glass in commercial or residential buildings.

The second category is "active" where the user controls the opacity of the glass. This category requires an electrical charge to change opacity of the smart-glass. Specifically, these technologies are liquid crystal, suspended particle devices, electrochromics, and reflective hybrids. Liquid crystals respond to an electrical charge by aligning perpendicular to the charged surface, allowing light to pass. When the electrical charge is absent, these liquid crystals become randomly oriented. The disadvantage of liquid crystals is that there are no intermediate light settings, wherein the smart-glass remains either clear or opaque.

Another technology used in a smart-window application utilizes small light-absorbing microscopic particles known as suspended particle devices (SPD). These particles line up in straight lines perpendicular to the conductive layer, enabling light to pass through the smart-glass. Once the voltage is removed, these particles move back into a random pattern. The disadvantage of SPD technology is that the smart-glass must be continually charged in order for the windows to appear transparent. This solution is not the most cost efficient.

Reflective hybrids, however, reflect light as oppose to absorbing light as with the SPD. This type of smart-glass includes a layer of nickel-magnesium alloy sandwiched between two glass panels which may be controlled to switch back and forth between a transparent and reflective state. This type of smart-glass is controlled by a low voltage or injection of hydrogen or oxygen gases.

The most practical and safe technology for smart-glass applications is electrochromic glass. Electrochromic windows darken when a voltage is applied and are transparent when the voltage is removed. Specifically, within electrochromic glass, an electrochromic film layer is applied to an ion conductor which layers on top of an ion storage layer. These three layers are sandwiched between two panels of glass or plastic each coated with a conductive oxide. A control device manually or automatically controls the voltage applied to the conductive oxide. When energized by an electrical current, a chemical reaction begins within the electrochromic film that makes the film change color. The chemical reaction is oxidation reaction wherein molecules of a compound loose an electron. Ions in the sandwiched electrochromic layers enable the material to change from opaque to transparent. The ions allow the electrochromic glass to absorb light. Thus, specifically, when a voltage is applied to the conductive oxide layers formed on the panels of glass, the voltage drives the ions from the ion storage layer through the ion conducting layer and into the electrochromic layer. This reaction effectively enables the electrochromic layer to function as a light valve by changing color when energized by this voltage. As a result, the electrochromic layer becomes opaque and blocks light by darkening when a voltage is applied to the conductive coating on the panels of glass. When the amount of voltage is decreased, the ions are driven out of the electrochromic layer into the ion storage layer. When the ions leave the electrochromic layer, the window lightens and regains its transparency. Once the voltage is removed, the film changes back to a translucent film, effectively allowing the light to pass from one glass panel to the next. An electrochromic smart window only requires electricity to generate the chemical reaction, whereby the window maintains its color without having constant application of a voltage.

More particularly, switchable glazings, more commonly referred to as "E-Glass", is an emerging category of glass structures having an electrochromic glass that use an electrical voltage to modify the amount of light passing through the glass by adjusting the opacity of the glass. Switchable glazings have applicability for a growing number of product applications including windows, interior partitions, skylights, appliances, instruments, advertising signage and more. In addition, switchable glazings can be used to control light glare and heat entering an office or a home. Interest in switchable glazing technology is influenced by many factors, including a growing movement to offer energy-efficient building solutions, and the emerging desire by users to maintain greater control over their working and living environments.

In particular, smart-glass allows a designer to design a multipurpose room for optimal home theater lighting without incorporating automatic blinds or curtains. Moreover, the glass helps maintain room temperature. Manufacturers also claim acoustic benefits, such as noise reduction, and improved air quality from smart-glass. Specifically, using EGlass, one is able to control the amount of sun entering a room without having to adjust the window-shades. In addition, one is able to obtain privacy without closing the curtains. EGlass eliminates the requirement for mechanical shades, blinds and other window coverings and opens up many design possibilities, particularly for odd shaped and hard-to-reach windows and skylights. A line of revolutionary windows, doors skylights and interior partitions, EGlass products electronically tint, shade and give privacy with the touch of a button.

To provide the feature of dimming the opacity within the smart-glass, one approach may be desirable to adjust the tint using a standard off-the-shelf light dimmer to adjust the voltage applied to the smart-glass. However, the characteristics of a typical dimmer are not directly compatible with the electrical characteristics of a smart-glass device. Several different lighting controls from various sources, including Lutron, have been used to offer discrete dimming of the glass but not full range continuous dimming. Thus, at the present, there are no current products that can offer a full range of dimming for the smart-glass.

A need exists for a lighting control that offers a full range of dimming for smart-glass.

The present invention is directed to overcoming, or at least reducing the effects of one or more of the problems set forth above.

SUMMARY OF THE INVENTION

To address the above-discussed deficiencies of light control systems for smart-glass, the present invention teaches a light control system having a full range of dimming for smart-glass. In particular, the present invention provides a light control system having an electrochromic glass control device that acts as an interface between an off-the-shelf dimmer and a electrochromic glass device where the interface converts an asymmetric alternating current (AC) power signal from the dimmer device into a symmetric, amplitude controlled AC output signal for controlling the tint of the electrochromic or smart-glass device. A symmetric AC output signal may be defined as a signal having symmetry about its peaks and/or symmetry about its zero-crossing points. An asymmetric AC power signal fails to exhibit symmetry either about its peaks or its zero-crossing point. The electrochromic glass control device employs a controllable semiconductor load across the output of the dimmer. The controllable semiconductor load has various advantages over a fixed resistor placed in parallel to the output of the dimmer. For example, a fixed resistor may cause various problems including excessive heat in the resistor and "chatter" in the smart-glass material, wherein chatter is caused by the sudden asymmetric switching of the output signal from the dimmer. The present invention helps reduce any such potential heat and "chatter" problems.

Specifically, the electrochromic glass control device in accordance with the present invention provides an interface between a dimmer and a smart-glass device. The electrochromic glass control device includes a powerline interface circuit that receives the asymmetric AC power signal from the dimmer. A controller connects to the powerline interface circuit to generate a control signal responsive to the asymmetric AC power signal. Connecting between the dimmer and the controller, an output stage generates the symmetrical AC output signal responsive to the control signal to control the smart-glass device.

The present invention can be employed in various applications. For example, the present invention can control suspended particle device (SPD) smart-glass lamination which is an electrochromic tint used in skylight and window glass applications. The present invention is also applicable to glass structures such as windows, interior partitions, skylights, appliances, instruments and advertising signage in environments such as commercial and residential architectural environments.

These and other features and advantages of the present invention will be understood upon consideration of the following detailed description of the invention and the accompanying drawings.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF PREFERRED EMBODIMENTS

The present invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
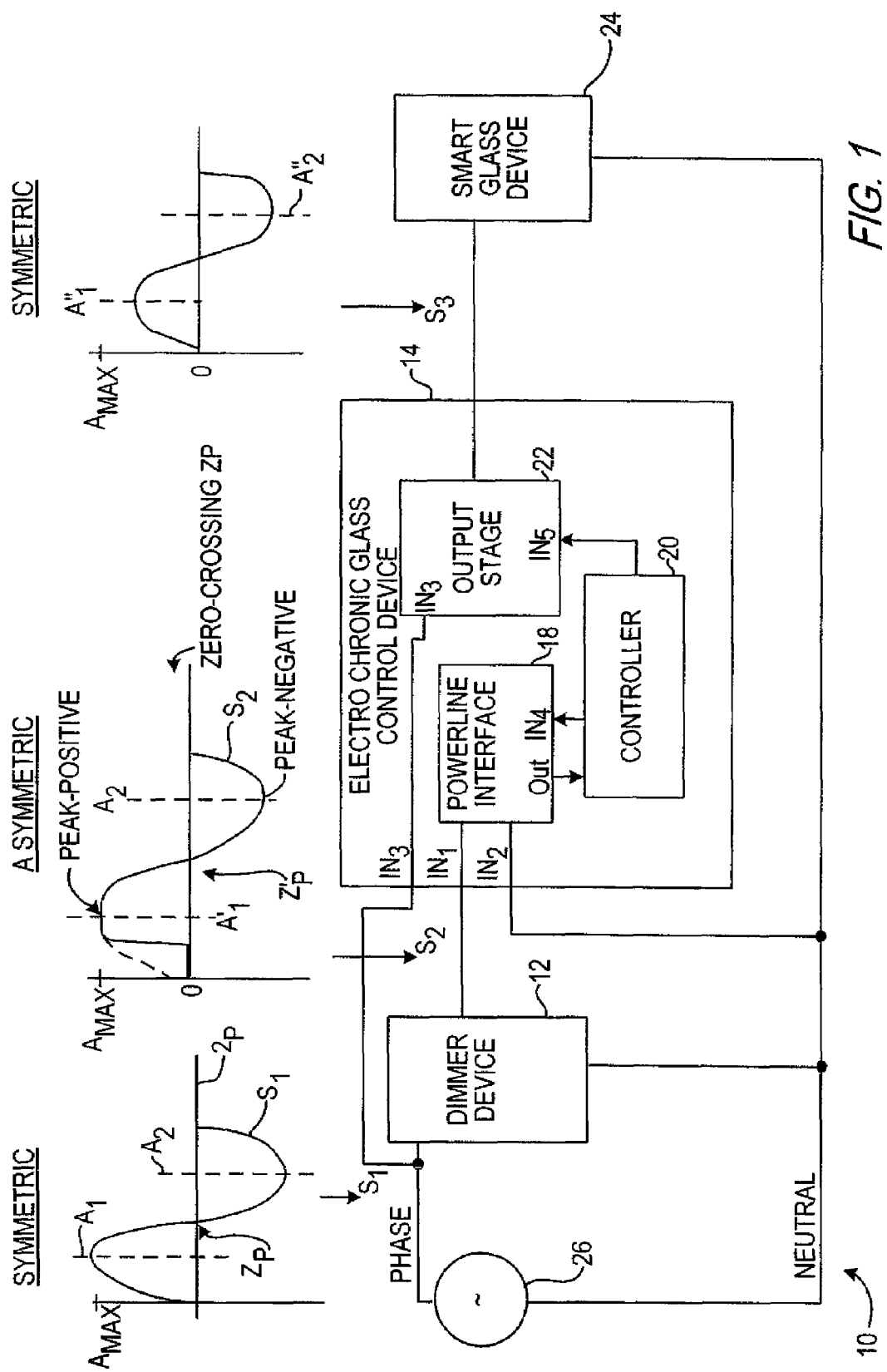
FIG. 1 is a block diagram of an electrochromic glass control system in accordance with an embodiment of the invention.

FIG. 1 represents a block diagram of an electrochromic or smart-glass control system 10 for controlling the tint of a smart-glass device 24 in accordance with an embodiment of the invention. A dimmer device 12 receives a symmetric signal $S_1$ from an alternating current (AC) power source 26 which has phase and neutral lines. Dimmer device 12 generates an asymmetric signal $S_2$ from the symmetric signal $S_1$ relative to the setting of a brightness adjustment control (e.g., slider switch, not shown) which sits on the dimmer device 12. A symmetric signal is a signal having symmetry about its peaks (highest and/or lowest amplitudes) and/or symmetry about its zero-crossing point. For example, signal $S_1$ is a symmetrical signal. Specifically, signal $S_1$ is symmetrical about its peaks, that is the axis exhibits a mirror image about axes $A_1$, $A_2$ and symmetrical about its zero-crossing point $Z_p$. On the other hand, signal $S_2$ is asymmetrical because it lacks symmetry (i.e., mirror image) about its axes $A_1'$, $A_2'$ and zero crossing point $Z_p'$. An electrochromic glass control device or a smart-glass device controller 14 connects between dimmer device 12 and the smart-glass device 24 to enable the dimmer 12 to control the opacity of the smart-glass device 24. The electrochromic glass control device 14 includes a power line interface 18, a controller 20 and a controllable output load stage 22. Power line interface 18 receives the asymmetric signal $S_2$ from the dimmer device 12. Controller 20 generates a control signal based on the asymmetric signal from power line interface 18. Controller 20 can be implemented using a microprocessor or other logic device that is capable of executing instructions in a programmable manner. The control signal is used to control output stage 22 such that output stage 22 generates an AC symmetric, amplitude controlled output signal $S_3$ to control the smart-glass device 24. Output stage 22 receives the signal S1 at its input as well. Signal $S_3$ is symmetrical because it is symmetrical about its axes $A_1''$ and $A_2''$. Signal $S_3$ is similar to signal $S_1$. The maximum amplitude that signal S3 may possess is the amplitude of signal $S_1$ represents the maximum amplitude.

Figure 2:
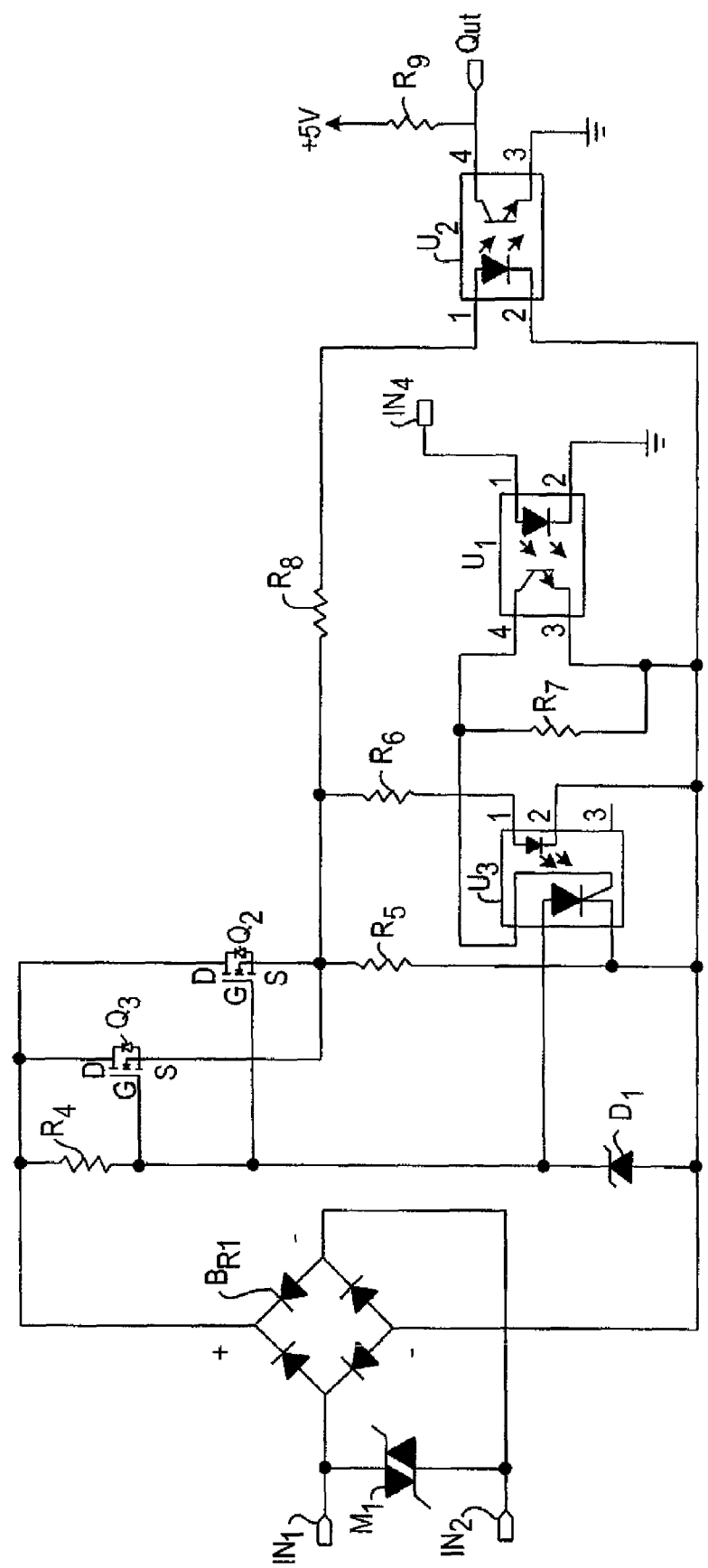
FIG. 2 is a schematic diagram of a power line interface circuit of an electrochromic glass control interface in accordance with an embodiment of the invention.
Figure 3:
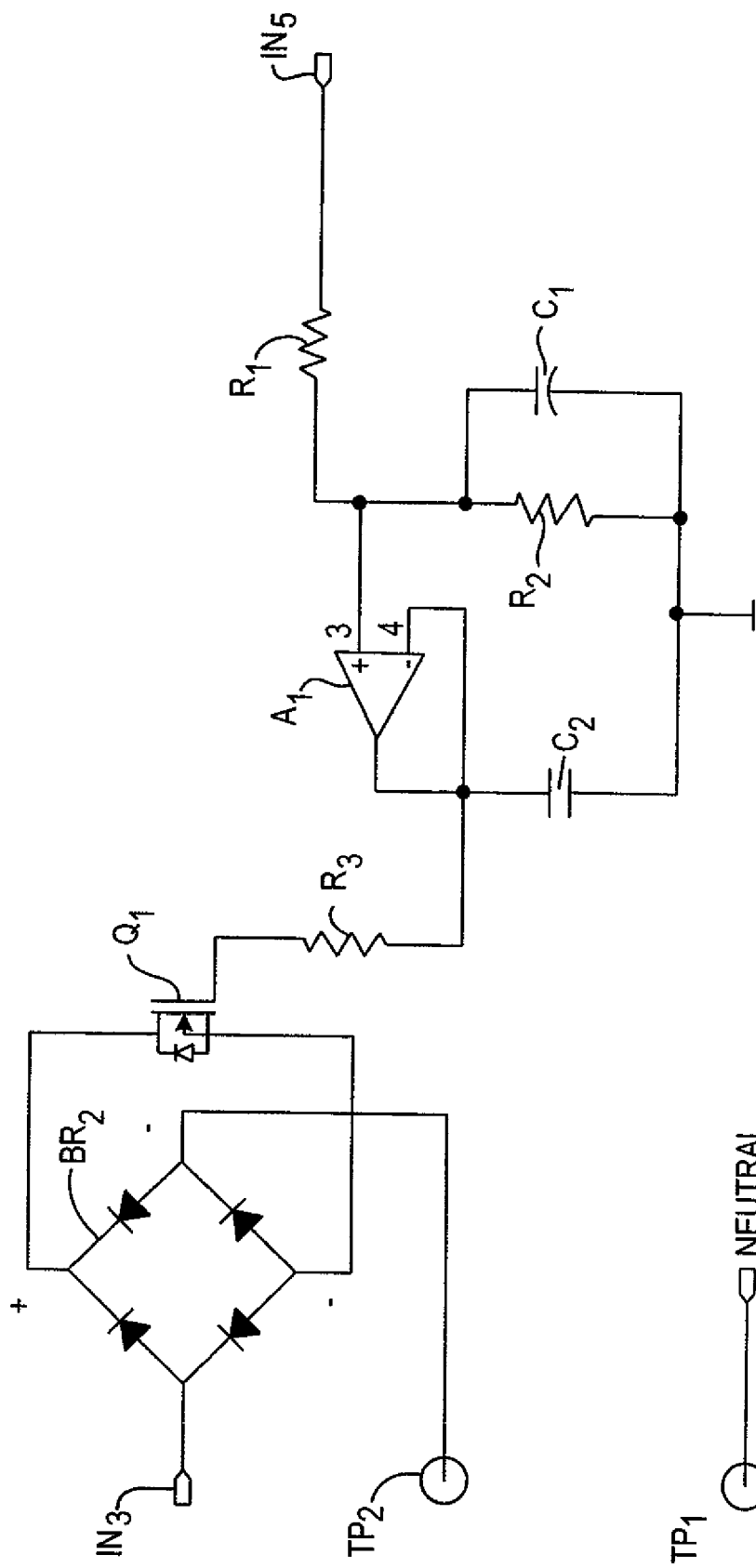
FIG. 3 is a schematic diagram of an output stage circuit of an electrochromic glass control interface in accordance with an embodiment of the invention.

FIGS. 2 and 3 are schematic diagrams of the components of an electrochromic glass control interface 14 of FIG. 1 in accordance with an embodiment of the invention. Referring to FIG. 2, the powerline interface circuit 18 includes a Metal Oxide Varistor (MOV) $M_1$ for surge protection of the device. Without some type of surge protection, excess voltage may damage the circuit. An MOV is a round disk made up of metal particles suspended in a ceramic compound. The MOV begins to conduct electricity and allows the excess voltage to flow into the disk to the ground while safe levels of voltage continue to flow into the circuit. Without surge protection, excess voltage goes into the circuit or anything plugged in and may cause damage. Although the damage may not be noticeable at the time the surge occurred, it will shorten the life of the circuit, or it could immediately make the circuit completely inoperable.

A full-wave bridge rectifier $B_{R1}$ connected to MOV $M_1$ receives the asymmetric AC signal from dimmer device 12 and generates a proportional direct current (DC) output signal. As is know to those skilled in the art, a full-wave bridge rectifier $B_{R1}$ is used to convert an AC signal into a digital one or DC signal. Specifically, rectifier $B_{R1}$ includes four rectifier diodes which are two-terminal electronic components that allow current to flow in only one direction, from an anode (+) to a cathode (−). As positive current is flowing from the AC signal at the input node $I_{N1}$, positive current flows through to the positive terminal of rectifier $B_{R1}$. As the AC signal goes negative, the AC signal is blocked at input node $I_{N2}$. Thereby, rectifier effective converts the asymmetric AC signal into a DC signal. Each of the four rectifier diodes are simple semiconductors having PN junctions with a positive or P-region of positive ions and a negative or N-region of negative electrons. Applying voltage to the PN junction causes current to flow in only one direction as electrons from the N-region fill "holes" in the P-region. Typically, rectifier diodes are made of semiconductor materials such as silicon, germanium or selenium. Full-wave rectifier diodes produce an unidirectional DC current by rectifying both the positive and negative half-cycles of the AC input.

When the clipped sign-wave-like signal $S_2$ comes to full-wave rectifier $B_{R1}$, positive arches appear at the output of the bridge rectifier $B_{R1}$. These arches are clipped like the first positive portion of signal $S_2$ such that the signal at the output of the full-wave rectifier $B_{R1}$ appears shark-fin shaped. Transistors $Q_2$ and $Q_3$ are driven by opto-isolator $U_3$. Transistors $Q_2$ and $Q_3$ control the load on the bridge $B_{R1}$. The shark-fin shaped signal exits the positive leg of bridge $B_{R1}$ and goes through the drain and source of transistors, $Q_2$ and $Q_3$. Resistors $R_5$, $R_6$ and $R_8$ provide different current levels for the bias of the components use in the opt-isolators $U_1$, $U_2$ and $U_3$.

Opto-isolators $U_1$, $U_2$, and $U_3$ provide electrical isolation between the AC powerline and the electrochromic glass control device 14. Specifically, each opto-isolator $U_1$, $U_2$, and $U_3$ is a device that uses optical techniques to electrically isolate two related circuits, typically a transmitter and a receiver. Each opto-isolator $U_1$, $U_2$, and $U_3$ utilize a light emitting diode (LED) for transmitting light as shown in FIG. 2. The light sensor in opto-isolator $U_1$ is a LASCR. In the alternative, the light sensor for opto-isolator $U_1$ and $U_3$ are n-type transistors that may be activated by light. As shown, the LED of each opto-isolator $U_1$, $U_2$, and $U_3$ and the respective light sensor are separated such that light may travel across a barrier but electrical current may not. In operation, when an electrical signal is applied to the input node 1 of each opto-isolator $U_1$, $U_2$, and $U_3$, each respective LED lights, which activates the respective light sensor (i.e. the LASCR or the n-type transistor). A corresponding electrical signal is generated at the output node 4 of each opto-isolator $U_1$, $U_2$, and $U_3$.

In particular, the current from the shark-fin shaped signal traverses through resistor $R_5$ and into opto-isolator $U_3$. When opto-isolator $U_1$ is activated, resistor $R_5$ presents a high impedance; thereby, changing the load on bridge $B_{R1}$. At this point, the shark-fin signal changes into a quick pulse and dissipates. Controller 20, however, reads the signal before it dissipates. Resistor $R_8$ feeds off the current provided by the source nodes of both transistors, $Q_2$ and $Q_3$ in an effort to drive the input of opto-isolator $U_2$. Opto-isolator $U_3$ will turn itself ON through resistor $R_6$; yet, opto-isolator $U_3$ may be forced OFF using opto-isolator $U_1$. The objective is to provide a low impedance such that the dimmer functions properly. The control input $I_{N3}$ of opto-isolator $U_1$ receives input from the controller 20. The light sensor within opto-isolator $U_1$ connects to pin 6 of opto-isolator $U_3$, to control the gate of the SCR within opto-isolator $U_3$. As a result, the SCR can be controlled independent of the LED at the input of opto-isolator $U_3$. Accordingly, the SCR of opto-isolator $U_3$ can be forced ON or OF by controller 20. In normal operation, when powerline interface 18 is powered, current flows through the drain and the source of transistors $Q_2$ and $Q_3$ to turn on the SCR of opto-isolator $U_3$. When the LED is powered, it emits light. Thus, the purpose of opto-isolator $U_1$ is to force opto-isolator $U_3$ ON and OFF. Node 5 of opto-isolator $U_3$ controls the gates of transistors $Q_2$ and $Q_3$. When the SCR of opto-isolator $U_3$ is OFF, the gates of transistors $Q_2$ and $Q_3$ are pulled positive which turns both transistors $Q_2$ and $Q_3$ ON. Each gate of either transistor, $Q_2$ and $Q_3$, can go low by turning on opto-isolator $U_3$, forcing the SCR opto-isolator $U_3$ to conduct which shuts OFF transistors $Q_2$ and $Q_3$. As a result, the impedance on the bridge $B_{R1}$ increases and the current drawn off the dimmer is lowered, eliminating heat from the circuit. Diode $D_1$ keeps the gate voltage applied at the gates of transistors $Q_2$ and $Q_3$ from rising too high. Neither gate can be directly tied to the line voltage. Thus, Zener diode $D_1$ provides a DC level to control the gate. There is a voltage generated across resistor at $R_4$ through diode $D_1$. The junction between resistor $R_4$ and diode $D_1$ is the control for gates of transistors, $Q_2$ and $Q_3$.

FIG. 3 illustrates the schematic of output stage 22. The output of the controller 20 of FIG. 1 connects to the output stage 22 shown in FIG. 3 at the input node $I_{N5}$. The voltage provided at input node $I_{N5}$ is divided down by the resistive network including resistors $R_1$, $R_2$ and capacitor $C_1$. Operational amplifier $A_1$ is configured as a non-inverting amplifier where the input voltage is applied to the non-inverting input (+) and feedback from the output is applied to the inverting input (−). The output voltage of amplifier A1 is divided down by resistor R3. The output signal of operational amplifier $A_1$ drives the gate of a field effect transistor (FET) transistor $Q_1$. In the alternative, transistor $Q_1$ can be another semiconductor controllable device. As shown, the drain and source of transistor $Q_1$ connect across the DC load portion of a full wave rectifier $B_{R2}$. As a result, an AC symmetrical signal is developed across the AC portion of the bridge rectifier $B_{R2}$. This symmetrical signal drives glass device 24 through glass device terminals $T_{P1}$ (a neutral terminal), $T_{P2}$.

At the junction between resistors, $R_1$ and $R_2$, is a varying DC level similar to the level that is seen at the junction where resistor $R_3$ and capacitor $C_2$ meet. But because the computer can't drive enough current to control the transistor, the current follower arrangement is used to have a little more push at the gate of transistor $Q_1$ in an effort to load the bridge.

Specifically, controller 20 generates a time based pulse width having a DC level that ranges from 1-5 milliseconds. The pulse width charges the voltage level on $C_1$ differently depending upon the length of the pulse width. As capacitor $C_1$ charges, it reaches a particular voltage and then it discharges back to the resistor $R_2$. The particular voltage level stored in capacitor C1 is related to the width of the pulse generated by controller 20. Amplifier $A_1$ provides current drive to the base or gate of transistor $Q_1$. At the output of amplifier $A_1$, a DC level that varies in amplitude related to the width of the pulse at input of resistor $R_1$ is provided. The signal provides enough current to drive the gate of transistor $Q_1$ which provides a current path for the DC side of the bridge $B_{R2}$. The current drawn through bridge $B_{R2}$ is related to the current flowing through bridge $B_{R2}$. Input node $I_{N3}$ receives the signal $S_1$ from the AC source 26. In particular, signal $S_1$ comes into one AC bridge diode leg and leaves another AC bridge diode leg. Effectively, the linear range of the transistor is used to control the current flow through bridge BR1. As a result, the current flow changes the voltage applied across the smart-glass.

In particular, the output stage 22 is not actually controlling the output of light, yet rather the output stage 22 controls the opacity of the smart-glass coupled to the output nodes $T_{P1}$ and $T_{P2}$. Diode bridge $B_{R2}$, which is controlled by the transistor $Q_1$, provides series impedance across the DC side of bridge $B_{R2}$. The more bridge $B_{R2}$ is loaded by transistor $Q_1$, the more current is permitted to flow through the bridge $B_{R2}$. As a result, more output voltage is seen at the output of the bridge $B_{R2}$ in nodes, $T_{P1}$ and $T_{P2}$. The amount of current applied to bridge $B_{R2}$ by transistor $Q_1$ is controlled by varying a pulse width of the input node $I_{N5}$. Thus, the wider the pulse that is presented at input node $I_{N5}$, the higher the voltage will be at the gate of the transistor $Q_1$. Accordingly, a greater amount of current is permitted to flow through the bridge $B_{R2}$ and a higher voltage is applied to the smart-glass connected to nodes $T_{P1}$ and $T_{P2}$. The higher the voltage applied across the smart-glass, the clearer the smart-glass becomes. Without the novel design of the electrochromic glass control device 14, another circuit is needed to generate a controlled symmetric voltage, otherwise the smart-glass material is not going to operate correctly.

Referring to FIGS. 1-3, in operation, dimmer device 12, connected between the AC power source 26 and electrochromic glass control device 14, generates an AC asymmetrical signal based on the brightness adjustment control settings on the dimmer device 12. Controller 20 receives the AC asymmetrical signal and, based on that signal, determines the percentage of the maximum voltage the dimmer device 12 provides. Controller 20 monitors the zero crossing of the signal produced by powerline interface 18. Controller 20 alters the impedance that the dimmer experiences by generating a pulse-width coordinated to that time duration on the output to control the current at the bridge $B_{R2}$ and, ultimately, the intensity of the glass. The amplifier A1 receives the signal from controller 20 for controlling the semiconductor device $Q_1$ which acts as a controllable load. The device $Q_1$ is first driven to a low impedance state. Afterwards, controller 20 switches the semiconductor device $Q_1$ into a high impedance state. Semiconductor device $Q_1$ operates in its linear range (acting as a load) and provides a regulated current passing through the AC legs of the bridge resulting in a symmetric, amplitude controlled signal across the glass device 24. This symmetric signal to the glass device 24 is supplied serially through the AC legs of the bridge $BR_2$ through the glass device terminals, $T_{P1}$ and $T_{P2}$.

The embodiment above is described in the context of an interface to a standard off-the-shelf dimmer device, however, one skilled in the art would appreciate that the invention can be applied to other configurations and applications. For example, in another embodiment, the electrochromic glass control device can be configured to provide network control, ambient heat sensing, light sensing, radio-frequency (RF) control, and/or IR remote control. In another embodiment, the electrochromic glass control device can be employed as a power extender connected to virtually any standard dimmer to allow full range dimming of glass devices. In another embodiment, the electrochromic glass control device can be configured as a networked power extender that can easily be tied into Leviton Manufacturing Company products such as the Dimension product line as well as light commercial systems and mini-systems. In yet another application, the interface circuit can be configured as a self-contained dimmer device being compatible with the aesthetics of Leviton products (e.g., Acenti or Avida) and capable of controlling a glass device directly. Specifically, a dimmer may be incorporated in the design of the electrochromic glass control device such that no external "off the shelf" dimmer is required. Experimentally, the electrochromic glass control device has been used to successfully modify an existing power extender manufactured by Leviton, providing the full range dimming feature.

In addition, those skilled in the art would recognize that the electrochromic glass control device may be used to control other smart-glass technologies, namely smart-glass made using liquid crystal, suspended particle devices, or reflective hybrids.

Advantages of this design include but are not limited to an electrochromic glass control device that offers a full range of dimming for smart-glass in a simple, cost effective design. As previously mentioned, this design that provides a controllable semiconductor load across the output of the dimmer eliminates problems associated with a fixed resistor solution such as excessive heat in the resistor and "chatter" in the smart-glass material. The present invention helps reduce any such potential heat and "chatter" problems.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

We claim:

1. An smart-glass control device for connecting between a dimmer and a smart-glass device, the smart-glass control device comprising:

an powerline interface circuit for receiving an asymmetric alternating current (AC) power signal from the dimmer;

a controller coupled to the powerline interface circuit for generating a control signal responsive to the asymmetric AC power signal; and an output stage coupled between the dimmer and the controller for generating a symmetrical AC output signal responsive to the control signal.

2. An smart-glass control device as recited in claim 1, wherein the smart-glass is an electrochromic glass device.

3. An smart-glass control device as recited in claim 1, wherein the smart-glass is a liquid crystal glass device.

4. An smart-glass control device as recited in claim 1, wherein the smart-glass is a suspended particle device.

5. An smart-glass control device as recited in claim 1, wherein the smart-glass is a reflective hybrid device.

6. An electrochromic glass control device for connecting between a dimmer and an electrochromic glass device, the electrochromic glass control device comprising:
   an powerline interface circuit for receiving an asymmetric alternating current (AC) power signal from the dimmer;
   a controller coupled to the powerline interface circuit for generating a control signal responsive to the asymmetric AC power signal; and
   an output stage coupled between the dimmer and the controller for generating a symmetrical AC output signal responsive to the control signal.

7. A electrochromic glass control device as recited in claim 6, wherein the powerline interface circuit, having a first and second input, comprises:
   a full-wave bridge rectifier, having a first input, a second input, a first output, a second output, the first input coupled to form the first input of the powerline interface circuit, the second input coupled to form the second input of the powerline interface circuit;
   a triode alternating current switch coupled between the first and second input of the powerline interface circuit;
   a first resistor coupled to the first output of the full-wave bridge rectifier;
   a first transistor, having a gate, a drain, and a source, the drain coupled to the first output of the full-wave bridge rectifier, the gate coupled to the first resistor;
   a second transistor, having a gate, a drain, and a source, the drain coupled to the first output of the full-wave bridge rectifier, the gate coupled to the first resistor, the source coupled to the source of the first transistor;
   a resistive network coupled to the source of the second transistor;
   a first control device, having a first input, a second input, a first output, a second output, and a third output, the second input coupled to the resistive network, first and third output coupled to the second output of the full-wave bridge rectifier;
   a Zener diode coupled between the second output of the full-wave bridge rectifier and first input of the first control device;
   a second control device, having a first input, a second input, a first output, and a second output, the first input coupled to the second output of the first control device, the first output coupled to the second output of the full-wave bridge rectifier, the second output coupled to ground;
   a second resistor coupled between the first input and first output of the second control device;
   a third control device, having a first input, a second input, a first output, and a second output, the first input coupled to the resistive network, the first output coupled to the second output of the full-wave bridge rectifier, the second input coupled to form an output for the powerline interface circuit, the second output coupled to ground; and
   a third resistor coupled between a power supply rail and the second input of the third control device.

8. A electrochromic glass control device as recited in claim 7, wherein the first control device is an opto-isolator, having a gate controlled switch and a light emitting diode, wherein the light emitted from the light emitting diode controls the gate controlled switch, the gate controlled switch having the first input, the first output and the second output, the light emitting diode having the second input, the third output.

9. A electrochromic glass control device as recited in claim 7, wherein the second control devices is an opto-isolator, having a n-type transistor and a light emitting diode, wherein the light emitted from the light emitting diode controls the n-type transistor, the n-type transistor having the first input and the first output, the light emitting diode having the second input and the second output.

10. A electrochromic glass control device as recited in claim 7, wherein the third control device is an opto-isolator, having a n-type transistor and a light emitting diode, wherein the light emitted from the light emitting diode controls the n-type transistor, the light emitting diode having the first input and the first output, the n-type transistor, having the second input and the second output.

11. A electrochromic glass control device as recited in claim 7, wherein the resistive network comprises:
   a fourth resistor, a fifth resistor and a sixth resistor coupled to the source of the second transistor, the fourth resistor coupled to the first output of the first opto-isolator, the fifth resistor coupled to the second input of the first opto-isolator, the sixth resistor coupled to the first input of the third opto-isolator.

12. A electrochromic glass control device as recited in claim 6, wherein the controller is a programmable logic device.

13. A electrochromic glass control device as recited in claim 6, wherein the controller is a microprocessor.

14. A electrochromic glass control device as recited in claim 6, wherein the output stage comprises:
   an operational amplifier, having an inverting, a non-inverting input, and an output, wherein the inverting input couples to the output;
   a first resistive network coupled between the dimmer device and the non-inverting input;
   a capacitor coupled between the inverting input and ground;
   a resistor coupled to the output of the operational amplifier;
   a transistor, having a gate a source and a drain, the gate coupled to the resistor; and
   a full-wave bridge rectifier, having a first input, a second input, a first output, and a second output, the first input coupled to the source of the transistor, the second input coupled to the drain of the transistor, the first output coupled to the smart-glass device.

15. A electrochromic glass control device as recited in claim 14, wherein the first resistive network comprises:
   a first resistor coupled between the dimmer device and the non-inverting input;
   a second resistor coupled between the non-inverting input and ground; and
   a second capacitor coupled in parallel with the second resistor.

* * * * *